United States Patent [19]

Lakshmanan et al.

[11] Patent Number: 4,537,628

[45] Date of Patent: Aug. 27, 1985

[54] RECOVERY OF PRECIOUS METALS

[75] Inventors: Vaikuntam I. Lakshmanan, Mississauga; Jurgen K. Biskupski, Toronto, both of Canada

[73] Assignee: Ontario Research Foundation, Mississauga, Canada

[21] Appl. No.: 558,469

[22] Filed: Dec. 6, 1983

[30] Foreign Application Priority Data

Dec. 7, 1982 [GB] United Kingdom ................. 8234879
Jun. 14, 1983 [GB] United Kingdom ................. 8316161
Jun. 14, 1983 [GB] United Kingdom ................. 8316163

[51] Int. Cl.$^3$ ............................................. C22B 11/00
[52] U.S. Cl. ....................................... 75/118 R; 75/2; 75/109; 75/107; 75/115; 75/121; 423/25; 423/29; 423/41; 423/87; 204/109
[58] Field of Search ...................... 423/87, 18, 29, 25, 423/41; 75/121, 101 R, 1 R, 118 R, 2, 107, 109, 115; 204/109

[56] References Cited

U.S. PATENT DOCUMENTS 1,178,081 4/1916 Layng .................................. 423/29
2,835,569 5/1958 Reynaud .............................. 423/87
4,394,357 7/1983 Mounsey et al. ................... 423/140

FOREIGN PATENT DOCUMENTS 2389679 1/1979 France .................................. 423/18
2043039 10/1980 United Kingdom ................. 423/18

*Primary Examiner*—John Doll
*Assistant Examiner*—Robert L. Stoll
*Attorney, Agent, or Firm*—Sim & McBurney

[57] ABSTRACT

The extent of recovery of precious metals, preferably gold and silver, from precious metal ores, concentrates, tailings and wastes which are also sulphide- and arsenic- and/or antimony-bearing, is enhanced by treatment with Caro's acid ($H_2SO_5$).

13 Claims, No Drawings

RECOVERY OF PRECIOUS METALS

FIELD OF INVENTION

The present invention relates to the treatment of ores.

BACKGROUND TO THE INVENTION

Gold usually is recovered from ores or concentrates by solubilization with sodium or potassium cyanide and subsequent precipitation or absorption to recover the precious metal from the solution. Certain gold-bearing ores have substantial quantities of arsenic associated therewith, usually present as a sulphide, and the presence of the arsenic inhibits solubilization of the gold, leading to only low gold recoveries from such ores. Initial roasting of arsenic-containing gold ores prior to cyanidation leads to increased yield but such roasting often leads to atmospheric pollution and is undesirable. Gold ores containing antimony and silver ores containing arsenic or antimony present similar problems.

SUMMARY OF INVENTION

In accordance with the present invention, sulphide-containing arsenic- and antimony-containing precious metal ores are treated with Caro's acid to oxidize at least part of the arsenic or antimony to a water-soluble form and thereby to provide the ore in a form from which the precious metal may be more readily recovered.

The invention has particular applicability to the treatment of arsenic sulphide-containing gold-bearing ores and will be described with particular reference thereto but also may be used for the treatment of other arsenic- or antimony-containing sulfurous precious metal-bearing ores, such as, silver-bearing ores. Further, the invention is applicable to the recovery of gold and other precious metals not only from arsenic- and antimony-containing sulfurous ores but also from other sulphide-containing arsenic- and antimony-containing materials, such as, wastes and tailings.

GENERAL DESCRIPTION OF INVENTION

In the process of the invention, the arsenic-containing gold ore is treated with Caro's acid, i.e. peroxymonosulphuric acid ($H_2SO_5$), to oxidize the arsenic sulfide in the ore to the water soluble arsenate form. Caro's acid is produced by reaction between 92 to 99% sulphuric acid and 50 to 75% aqueous hydrogen peroxide in a mole ratio of 1.5:1 to 3.5:1. The acid may be diluted with water for use in this invention, and usually has a concentration in the range of about 15 to about 30%.

It is unnecessary to oxidize all the arsenic present in the starting material to enable improved gold recovery to be achieved and raw material costs may make it economically unviable to effect complete oxidation. Partial oxidation and solubilization of oxidized products result in the formation of fissures or capillaries in the lattice of the ore body, so that greater access to the gold, which may be present in elemental or compound form depending on the ore body, by gold leaching chemicals can be achieved.

The ore material usually first is ground to a finely-divided form to facilitate contact and reaction between the Caro's acid and the ore material and the ground ore is formed into a slurry and Caro's acid added to the slurry. The amount of Caro's acid used is calculated stoichiometrically to be at least sufficient to effect the desired degree of oxidation of the arsenic present in the ground ore to soluble arsenic compounds. The mixture of ground ore and Caro's acid is agitated for a period of time sufficient to oxidize the charge. The solution conditions during treatment with Caro's acid may be monitored by monitoring the e.m.f. of the solution, preferably to an end-point e.m.f. of about 450 millivolts. Following completion of the reaction, the treated ore is separated from the spent acid, such as, by filtration.

The treated ore material which results from the process of the invention is in a form from which gold or other precious metal is more readily removed, so that the overall recovery of gold from the original ore is improved.

The Caro's acid-treated material may be processed by any convenient technique to recover the precious metal therefrom, generally by solubilization of the precious metal and subsequent separation of precious metal in metallic form from the resulting solution.

One such technique is by treatment with an aqueous alkali metal cyanide solution, usually sodium or potassium cyanide solution to solubilize the precious metal. After separation of the resulting solution from residual solid phase, the precious metal cyanide solution is processed to recover the metal.

Processing may involve sedimentation of the precious metal by treatment with a metallic reducing agent for gold, usually zinc and smelting of the resulting gold containing sponge to recover pure gold. Another gold cyanide solution processing procedure which may be used comprises contacting the gold cyanide solution with a solid absorbing medium, usually activated carbon or an ion-exchange resin, to absorb the gold cyanide therein, eluting a concentrated gold cyanide solution by contact of the activated carbon or ion-exchange resin with, an aqueous alkali metal cyanide solution, usually a sodium cyanide solution, and electroplating the gold out of solution, usually onto a gold electrode.

Recovery of precious metal from the pretreated ore also may be effected by leaching the ore an aqueous solution of a thio compound, usually with thiourea or a thiosulphate, to solubilize the gold or other precious metal. The precious metal may be obtained in solid form from the resulting solution by any convenient technique, such as, electroplating.

Since treatment of the initial ore material enhances the ability to recover gold and silver from arsenic- and antimony-containing ores and other materials, the prior art necessity to roast the arsenic-containing material is avoided and hence the polluting effect thereof is eliminated.

EXAMPLES

Example 1

Gold-bearing arsenopyrite concentrate was treated with sodium cyanide solution and the distribution of gold in the solution and in the residue was determined. Runs were performed with and without pretreatment of the concentrate with Caro's acid in a stoichiometric amount to oxidize the arsenic present. The process conditions are set forth in the following Table I:

TABLE I

| Caro's Acid Treatment | | | | | | Cyanidation | | |
|---|---|---|---|---|---|---|---|---|
| Strength (%) | l/t Sol'n. | l/t Ore | Duration (hrs) | pH Start | pH Test | NaCN (kg/ton) | Ca(OH)$_2$ (kg/ton) | Time (hrs) |
| 22 | 90 | 120 | 24 | 3.0 | 12.5 | 6.7 | 18.8 | 24 |
| none | | | | 5.6 | 10.0 | 9.7 | 33.8 | 24 |

The results obtained are reproduced in the following Table II:

TABLE II

| | Au oz/ton Ore | Au oz/ton Residue | Au Distribution % Residue | Au Distribution % Solution |
|---|---|---|---|---|
| With Acid Leaching | 0.23 | 0.10 | 35.6 | 64.4 |
| Without Acid Leaching | 0.23 | 0.20 | 87.0 | 13.0 |

The results of the above Table II show that the pretreatment of the concentrate with Caro's acid leads to considerably enhanced recovery of gold.

Example 2

A series of tests was conducted in which arsenic-containing gold ores and concentrate were treated with sodium cyanide solution to leach gold therefrom, with and without an initial pretreatment with 22% concentration Caro's acid for 48 hours. Gold was recovered from the sodium cyanide solution. The quantity of gold present in both the starting material (head) and the residue were determined as was the overall recovery of gold from the ore concentrate.

The results obtained are reproduced in the following Table III:

TABLE III

| Test | Caro's Acid Strength (%) | Caro's Acid l/t Soln. | Caro's Acid l/t ore | Caro's Acid Duration (hrs) | Cyanidation pH Start | Cyanidation pH Test | Cyanidation NaCN kg/ton | Cyanidation Ca(OH)$_2$ kg/t | Cyanidation Time (hrs) | Gold Head (ppm) | Gold Residue (ppm) | Recovery (%) |
|---|---|---|---|---|---|---|---|---|---|---|---|---|
| 1A | | | none | | 7.0 | 11.5 | 0.20 | 6.7 | 24 | 6.2 | 2.0 | 67.2 |
| 1B | 25 | 90 | 180 | 24 | 3.0 | 11.5 | 1.6 | 13.2 | 24 | 6.2 | 1.2 | 81.2 |
| 2A | | | none | | 6.7 | 11.5 | 0.22 | 7.3 | 24 | 6.2 | 2.1 | 66.7 |
| 2B | 22 | 36 | 180 | 24 | 2.0 | 11.4 | 2.0 | 14.8 | 24 | 6.2 | 1.7 | 74.4 |
| 3A | | | none | | 3.6 | 11.3 | 0.5 | 11.6 | 24 | 5.1 | 1.4 | 73.3 |
| 3B | 22 | 36 | 180 | 24 | 2.2 | 11.0 | 1.8 | 14.8 | 24 | 5.1 | 1.1 | 79.1 |
| 4A | | | none | | 6.2 | 11.0 | 4.1 | 24.0 | 48 | 47.3 | 17.1 | 63.8 |
| 4B | 22 | 6.7 | 10.0 | 24 | 7.0 | 11.0 | 3.3 | 26.7 | 48 | 47.3 | 13.4 | 71.2 |
| 5A | | | none | | 7.3 | 10.5 | 0.58 | 16.0 | 48 | 18.2 | 0.6 | 96.6 |
| 5B | 22 | 8.2 | 10.0 | 24 | 4.0 | 11.4 | 0.20 | 31.6 | 48 | 18.2 | 0.5 | 97.2 |
| 6A | | | none | | 7.1 | 11.2 | 0.65 | 27.6 | 48 | 18.2 | 0.45 | 97.5 |
| 6B | 22 | 4.3 | 10.0 | 24 | 4.1 | 11.2 | 0.35 | 37.8 | 48 | 18.2 | 0.45 | 97.5 |

As may be seen from the above Table III, the results of Tests 1 to 4 show that pretreatment of the ore concentrate with Caro's acid increased the potential degree of recovery of gold from the ore concentrate upon subsequent cyanidation. In the case of Tests 5 and 6, the results show that pretreatment of the ore concentrate with Caro's acid enables the quantity of sodium cyanide required to achieve approximately the same gold recovery to be decreased.

Example 3

A material containing silver, arsenic and other metals was treated with sodium cyanide solution and the distribution of silver in the solution and in the residue was determined. Runs were performed with and without pretreatment of the concentrate with Caro's acid in a stoichiometric amount to oxidize the arsenic present. The process conditions are set forth in the following Table IV:

TABLE IV

| Caro's Acid Treatment | | | | | | Cyanidation | | |
|---|---|---|---|---|---|---|---|---|
| Strength (%) | l/t Sol'n. | l/t Ore | Duration (hrs) | pH Start | pH Test | NaCN (kg/ton) | Ca(OH)$_2$ (kg/ton) | Time (hrs) |
| 22 | 30 | 36.4 | 24 | 3.0 | 12.0 | 33.8 | 80.0 | 24 |
| none | | | | 4.8 | 11.5 | 52.2 | 96.4 | 24 |

The results obtained are reproduced in the following Table V:

TABLE V

| | Ag oz/ton Feed | Ag oz/ton Residue | Ag Distribution % Residue | Ag Distribution % Solution |
|---|---|---|---|---|
| With acid leach | 99.3 | 22.7 | 22.9 | 77.1 |
| Without acid leach | 70.4 | 21.0 | 29.8 | 70.2 |

The results of the above Table V show that the pretreatment of the feed with Caro's acid leads to enhanced recovery of silver. A considerable decrease in sodium cyanide consumption was observed, with sodium cyanide feed per metric ton of test feed being 26.0 kg for the acid-treated material and 52.2 kg for the untreated material.

Example 4

Arsenic-containing silver ore concentrates were treated with sodium cyanide solution to leach silver therefrom, with and without an initial pretreatment with Caro's acid. In each case, cyanidation was effected using 1% NaCN at 20% solids and a pH of 12 to 12.5 for 48 hours. The silver content of the ore concentrate (head) and residue and the recovery of silver effected were determined.

The results obtained are reproduced in the following Table VI:

TABLE VI

| Test | Caro's Acid Treatment l/ton | Silver Head ppm | Silver Residue ppm | Recovery % |
|---|---|---|---|---|
| 1A | none | 2415 | 705 | 70.8 |
| 1B | 36.4 | 2415 | 497 | 89.7 |
| 2A | none | 1927 | 1412 | 26.7 |
| 2B | 193.6 | 1927 | 1255 | 37.9 |

As may be seen from the results of the above Table VI, pretreatment of the ore with Caro's acid enabled an improved recovery of silver from the ore to be effected.

SUMMARY OF DISCLOSURE

In summary of this disclosure, the present invention provides a process of pretreating arsenic- or antimony-containing sulfurous precious metal materials to enable enhanced recovery of precious metal from the materials to be effected. Modifications are possible within the scope of the invention.

What we claim is:

1. In a method of recovery of a precious metal from a sulphide-containing arsenic- and/or antimony-containing precious metal-containing material, the improvement which comprises treating said material with $H_2SO_5$ to oxidize at least part of the arsenic and/or antimony content of the material to a water-soluble form prior to processing to effect said precious metal recovery.

2. The method of claim 1 wherein said material is in the form of an ore or concentrate thereof.

3. The method of claim 1 wherein said material is in the form of tailings or waste material.

4. The method of claim 1 wherein said precious metal is gold or silver.

5. The method of claim 1 wherein said $H_2SO_5$ is used at a concentration of about 15 to about 30%.

6. A method of pretreatment of a sulphide-containing arsenic- and/or antimony-containing precious metal ore or concentrate thereof to render the same more susceptible to recovery of said precious metal therefrom, which comprises contacting said ore or concentrate thereof with $H_2SO_5$ in an amount at least sufficient to effect at least partial oxidation of said arsenic and/or antimony to a water-soluble form.

7. The method of claim 6 wherein said ore or concentrate is provided in finely-divided form and is contacted with said $H_2SO_5$ as an agitated slurry of the finely divided ore or concentrate in $H_2SO_5$ having a concentration of about 15 to about 30%.

8. The method of claim 7 wherein treated ore is separated from spent acid following completion of said treatment and the treated ore is further processed to recover the precious metal therefrom.

9. The method of claim 8 wherein said treated ore is further processed by contacting with an aqueous alkali metal cyanide solution to solubilize the precious metal and processing the resulting precious metal cyanide solution to recover the metal therefrom.

10. The method of claim 9 wherein said precious metal is gold and said cyanide solution is processed by treatment with metallic reducing agent for gold and smelting of the resulting gold-containing sponge to recover pure gold.

11. The method of claim 9 wherein said precious metal is gold and said cyanide solution is processed by contacting the gold cyanide solution with a solid absorbing medium to absorb the gold cyanide therein, eluting a concentrated gold cyanide solution from the absorbing medium by contact with an aqueous alkali metal cyanide solution, and electroplating the gold out of solution.

12. The method of claim 8 wherein said treated ore is processed by leaching with an aqueous solution of a thiocompound to solubilize the precious metal, and recovering the precious metal from the resulting solution.

13. The method of claim 12 wherein the thiocompound is thiourea or a thiosulphate.

* * * * *